United States Patent
Casu et al.

(10) Patent No.: US 11,159,498 B1
(45) Date of Patent: Oct. 26, 2021

(54) INFORMATION SECURITY PROXY SERVICE

(71) Applicant: Amazon Technologies, Inc., Seattle, WA (US)

(72) Inventors: Cristinel Casu, Iasi (RO); Dan Mutescu, Iasi (RO); Armen Bearj Shimoon, Cupertino, CA (US); Igor Spac, Iasi (RO); Cristi Ursachi, Iasi (RO)

(73) Assignee: Amazon Technologies, Inc., Seattle, WA (US)

( * ) Notice: Subject to any disclaimer, the term of this patent is extended or adjusted under 35 U.S.C. 154(b) by 103 days.

(21) Appl. No.: 15/927,954

(22) Filed: Mar. 21, 2018

(51) Int. Cl.
*H04L 29/06* (2006.01)
*H04L 9/08* (2006.01)

(52) U.S. Cl.
CPC ........ *H04L 63/0442* (2013.01); *H04L 9/0825* (2013.01); *H04L 63/061* (2013.01); *H04L 63/083* (2013.01); *H04L 63/10* (2013.01)

(58) Field of Classification Search
CPC . H04L 63/0442; H04L 9/0825; H04L 63/061; H04L 63/083; H04L 63/10
See application file for complete search history.

(56) References Cited

U.S. PATENT DOCUMENTS

| | | |
|---|---|---|
| 6,915,433 B1 | 7/2005 | Barber |
| 7,526,085 B1 * | 4/2009 | Bong .................... H04L 63/061 380/37 |
| 7,827,408 B1 | 11/2010 | Gehringer et al. |
| 8,028,329 B2 | 9/2011 | Whitcomb |
| 8,385,555 B2 * | 2/2013 | Tang ...................... H04L 63/068 380/278 |
| 8,416,709 B1 | 4/2013 | Marshall et al. |
| 8,601,263 B1 | 12/2013 | Shankar et al. |
| 8,782,403 B1 | 7/2014 | Satish et al. |
| 9,003,200 B1 * | 4/2015 | Gardner ................ G06F 16/137 713/189 |
| 9,268,958 B1 | 2/2016 | Kessler |
| 9,363,079 B2 | 6/2016 | Song et al. |
| 9,367,697 B1 | 6/2016 | Roth et al. |
| 9,519,696 B1 * | 12/2016 | Roth ...................... G06F 16/258 |
| 9,521,000 B1 * | 12/2016 | Roth ...................... H04L 9/3247 |

(Continued)

FOREIGN PATENT DOCUMENTS

| | | |
|---|---|---|
| AU | 2012250524 A1 | 11/2013 |
| CN | 101452536 A | 6/2009 |

(Continued)

OTHER PUBLICATIONS

Atkinson, R., "IP Authentication Header," Request for Comments: 1826, Standards Track, Aug. 1995, 14 pages.

(Continued)

*Primary Examiner* — Aravind K Moorthy
(74) *Attorney, Agent, or Firm* — Davis Wright Tremaine LLP

(57) ABSTRACT

A system and method for providing data such as credentials to a third-party service while protecting the data from exposure to intermediate services. The system receives a first request containing encrypted data, generates a second request by replacing the encrypted data from the first request with unencrypted data, and transmits the second request to the third-party service.

20 Claims, 9 Drawing Sheets

(56) References Cited

U.S. PATENT DOCUMENTS

| | | | |
|---|---|---|---|
| 9,530,011 B2 | 12/2016 | French | |
| 9,665,722 B2 | 5/2017 | Nagasundaram et al. | |
| 9,729,518 B1 | 8/2017 | Atsatt | |
| 10,110,611 B2 | 10/2018 | Dayka et al. | |
| 10,979,403 B1* | 4/2021 | Mutescu | H04L 63/123 |
| 2002/0112167 A1 | 8/2002 | Boneh et al. | |
| 2003/0046586 A1 | 3/2003 | Bheemarasetti et al. | |
| 2004/0133812 A1* | 7/2004 | Ohmori | H04L 61/10 |
| | | | 726/18 |
| 2004/0260921 A1* | 12/2004 | Treadwell | H04L 63/045 |
| | | | 713/150 |
| 2005/0177724 A1 | 8/2005 | Ali et al. | |
| 2005/0234828 A1 | 10/2005 | Matsuyama et al. | |
| 2006/0123226 A1 | 6/2006 | Kumar et al. | |
| 2006/0242412 A1 | 10/2006 | Jung et al. | |
| 2007/0079117 A1 | 4/2007 | Bhogal et al. | |
| 2007/0094394 A1 | 4/2007 | Singh et al. | |
| 2007/0130464 A1 | 6/2007 | Swedor et al. | |
| 2007/0203970 A1 | 8/2007 | Nguyen | |
| 2007/0245416 A1 | 10/2007 | Dickinson et al. | |
| 2007/0276958 A1 | 11/2007 | Curtis et al. | |
| 2007/0294539 A1 | 12/2007 | Shulman et al. | |
| 2008/0084996 A1 | 4/2008 | Chen et al. | |
| 2008/0289019 A1* | 11/2008 | Lam | G06F 21/41 |
| | | | 726/9 |
| 2009/0106550 A1 | 4/2009 | Mohamed | |
| 2009/0158441 A1 | 6/2009 | Mohler et al. | |
| 2009/0252323 A1 | 10/2009 | Cooper | |
| 2009/0300719 A1* | 12/2009 | Ferris | G06F 21/606 |
| | | | 726/3 |
| 2010/0005483 A1 | 1/2010 | Rao | |
| 2010/0063988 A1* | 3/2010 | Khalid | H04L 45/50 |
| | | | 709/202 |
| 2010/0104101 A1 | 4/2010 | Dickinson et al. | |
| 2010/0205441 A1 | 8/2010 | Sandberg et al. | |
| 2010/0292556 A1 | 11/2010 | Golden | |
| 2011/0016156 A1 | 1/2011 | Golobay et al. | |
| 2011/0078285 A1 | 3/2011 | Hawkins et al. | |
| 2011/0085667 A1 | 4/2011 | Berrios et al. | |
| 2011/0145573 A1 | 6/2011 | Nakai et al. | |
| 2011/0161656 A1 | 6/2011 | Rao | |
| 2012/0045064 A1 | 2/2012 | Rembarz et al. | |
| 2012/0084835 A1 | 4/2012 | Thomas et al. | |
| 2012/0173679 A1* | 7/2012 | Li | H04L 69/08 |
| | | | 709/220 |
| 2013/0046995 A1* | 2/2013 | Movshovitz | H04L 9/0618 |
| | | | 713/189 |
| 2013/0070925 A1 | 3/2013 | Yamada et al. | |
| 2013/0086379 A1* | 4/2013 | Shimizu | H04L 63/0485 |
| | | | 713/160 |
| 2013/0091351 A1 | 4/2013 | Manges | |
| 2013/0333009 A1 | 12/2013 | Mackler | |
| 2014/0047485 A1* | 2/2014 | Shaw | H04W 48/16 |
| | | | 725/62 |
| 2014/0109107 A1 | 4/2014 | Wilkinson et al. | |
| 2014/0136834 A1 | 5/2014 | Sherkin et al. | |
| 2014/0189117 A1* | 7/2014 | Niimura | H04L 67/16 |
| | | | 709/225 |
| 2014/0195798 A1 | 7/2014 | Brugger et al. | |
| 2014/0229737 A1 | 8/2014 | Roth et al. | |
| 2014/0373165 A1 | 12/2014 | Margolin | |
| 2015/0006908 A1 | 1/2015 | Mori et al. | |
| 2015/0019858 A1* | 1/2015 | Roth | H04L 63/20 |
| | | | 713/150 |
| 2015/0074393 A1 | 3/2015 | Zhang | |
| 2015/0222424 A1* | 8/2015 | Mosko | H04L 9/08 |
| | | | 713/171 |
| 2015/0222603 A1* | 8/2015 | Uzun | H04L 63/0428 |
| | | | 713/160 |
| 2015/0244517 A1 | 8/2015 | Nita | |
| 2015/0288512 A1 | 10/2015 | McGregor et al. | |
| 2015/0294117 A1* | 10/2015 | Cucinotta | G06F 21/74 |
| | | | 713/189 |
| 2015/0334095 A1 | 11/2015 | Thibaudeau | |
| 2016/0055770 A1 | 2/2016 | Li | |
| 2016/0072927 A1 | 3/2016 | Xue et al. | |
| 2016/0094723 A1 | 3/2016 | Jerath et al. | |
| 2016/0191469 A1 | 6/2016 | Zatko et al. | |
| 2016/0261418 A1 | 9/2016 | Keene et al. | |
| 2017/0034237 A1 | 2/2017 | Silver | |
| 2017/0048254 A1* | 2/2017 | Avi-Dan | G06F 21/62 |
| 2017/0093916 A1* | 3/2017 | Arumugam | G06F 21/602 |
| 2017/0103217 A1* | 4/2017 | Arasu | H04L 9/0637 |
| 2017/0118215 A1 | 4/2017 | Varadarajan et al. | |
| 2017/0126638 A1 | 5/2017 | Ye et al. | |
| 2017/0142191 A1* | 5/2017 | Caldwell | H04L 43/0852 |
| 2017/0171200 A1 | 6/2017 | Bao et al. | |
| 2017/0201495 A1 | 7/2017 | Cooley | |
| 2018/0011867 A1* | 1/2018 | Bowman | G06F 21/602 |
| 2018/0013729 A1* | 1/2018 | Cooper | H04L 63/102 |
| 2018/0041481 A1* | 2/2018 | Paz de Araujo | H04L 9/0819 |
| 2018/0063275 A1 | 3/2018 | Kolhi et al. | |
| 2018/0130062 A1 | 5/2018 | O'Donnell et al. | |
| 2018/0176193 A1* | 6/2018 | Davis | H04L 63/029 |
| 2018/0183802 A1 | 6/2018 | Choyi et al. | |
| 2018/0199190 A1 | 7/2018 | Khan et al. | |
| 2018/0218446 A1 | 8/2018 | Ries et al. | |
| 2018/0234508 A1 | 8/2018 | Tsadok | |
| 2018/0247302 A1* | 8/2018 | Armstrong | H04L 63/0471 |
| 2019/0014094 A1* | 1/2019 | Le Saint | H04L 63/06 |
| 2019/0044904 A1* | 2/2019 | Khalil | H04L 63/06 |
| 2019/0182250 A1 | 6/2019 | Kiester et al. | |
| 2019/0207914 A1* | 7/2019 | Gong | H04L 63/08 |
| 2021/0135865 A1* | 5/2021 | Joseph | H04L 9/30 |

FOREIGN PATENT DOCUMENTS

| | | | |
|---|---|---|---|
| CN | 102138299 A | 7/2011 | |
| CN | 103916456 A | 7/2014 | |
| CN | 105207991 A | 12/2015 | |
| CN | 105681039 A | 6/2016 | |
| EP | 3005646 A1 | 4/2016 | |
| JP | H01161457 A | 6/1989 | |
| JP | 200282609 A | 3/2002 | |
| JP | 2002297606 A | 10/2002 | |
| JP | 2004206573 A | 7/2004 | |
| JP | 2005234759 A | 9/2005 | |
| JP | 2005309846 A | 11/2005 | |
| JP | 2009044320 A | 2/2009 | |
| JP | 6255154 B1 | 8/2013 | |
| JP | 2015505994 A | 2/2015 | |
| JP | 2015090993 A | 5/2015 | |
| JP | 2015126320 A | 7/2015 | |
| JP | 2016508699 A | 3/2016 | |
| JP | 2016054430 A | 4/2016 | |
| JP | 2016146618 A | 8/2016 | |
| JP | 2016524429 A | 8/2016 | |
| WO | 2008146332 A1 | 12/2008 | |
| WO | 2015013412 A1 | 1/2015 | |

OTHER PUBLICATIONS

Atkinson, R., "IP Encapsulating Security Payload (ESP)," Request for Comments: 1827, Standards Track, Aug. 1995, 13 pages.

Atkinson, R., "Security Architecture for the Internet Protocol," Request for Comments: 1825, Standards Track, Aug. 1995, 23 pages.

Blake-Wilson, S., et al., "Elliptic Curve Cryptography (ECC) Cipher Suites for Transport Layer Security (TLS)," Request for Comments: 4492, Informational, May 2006, 36 pages.

Blake-Wilson, S., et al., "Transport Layer Security (TLS) Extensions," Request for Comments: 3546, Standards Track, Jun. 2003, 28 pages.

Blake-Wilson, S., et al., "Transport Layer Security (TLS) Extensions," Request for Comments: 4366, Standards Track, Apr. 2006, 29 pages.

Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.

(56) References Cited

OTHER PUBLICATIONS

Brown, M., and R. Housley, "Transport Layer Security (TLS) Authorization Extensions," Request for Comments: 5878, Experimental, May 2010, 19 pages.
Chown, P., "Advanced Encryption Standard (AES) Ciphersuites for Transport Layer Security (TLS)," Request for Comments: 3268, Standards Track, Jun. 2002, 8 pages.
Dierks, T., and E. Rescorla, "The Transport Layer Security (TLS) Protocol Version 1.2," Request for Comments: 5246, Standards Track, Aug. 2008, 98 pages.
Dierks, T., et al., "The TLS Protocol Version 1.0," Request for Comments: 2246, Standards Track, Jan. 1999, 75 pages.
Eastlake, D., "Transport Layer Security (TLS) Extensions: Extension Definitions," Request for Comments: 6066, Standards Track, Jan. 2011, 25 pages.
Eronen, P., and H. Tschofenig, "Pre-Shared Key Ciphersuites for Transport Layer Security (TLS)," Request for Comments: 4279, Standards Track, Dec. 2005, 16 pages.
Ford-Hutchinson, P., "Securing FTP with TLS," Request for Comments: 4217, Standards Track, Oct. 2005, 29 pages.
Friend, R., "Transport Layer Security (TLS) Protocol Compression Using Lempel-Ziv-Stac (LZS)," Request for Comments: 3943, Informational, Nov. 2004, 13 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.
Hoffman, P., "SMTP Service Extension for Secure SMTP over Transport Layer Security," Request for Comments: 3207, Standards Track, Feb. 2002, 9 pages.
Hollenbeck, S., "Transport Layer Security Protocol Compression Methods," Request for Comments: 3749, Standards Track, May 2004, 8 pages.
Housley, R., "Using Advanced Encryption Standard (AES) CCM Mode With IPsec Encapsulating Security Payload (ESP)," Request for Comments: 4309, Standards Track, Dec. 2005, 14 pages.
International Search Report and Written Opinion dated Apr. 5, 2018, International Patent Application No. PCT/US2017/066170, Dec. 13, 2017, 13 pages.
International Search Report and Written Opinion dated Apr. 6, 2018, International Patent Application No. PCT/US2017/066165, filed Dec. 13, 2017, 16 pages.
International Search Report and Written Opinion dated Mar. 7, 2018, International Patent Application No. PCT/US2017/066171, filed Dec. 13, 2017, 17 pages.
Kanno, S., and M. Kanda, "Addition of the Camellia Cipher Suites to Transport Layer Security (TLS)," Request for Comments: 6367, Informational, Sep. 2011, 9 pages.
Karn, P., et al., "The ESP DES-CBS Transform," Request for Comments: 1829, Standards Track, Aug. 1995, 11 pages.
Kato, A., et al., "Camellia Cipher Suites for TLS," Request for Comments: 5932, Standards Track, Jun. 2010, 7 pages.
Kent, S., "IP Encapsulating Security Payload (ESP)," Request for Comments: 4303, Standards Track, Dec. 2005, 45 pages.
Kent, S., and K. Seo, "Security Architecture for the Internet Protocol," Request for Comments: 4301, Standards Track, Dec. 2005, 102 pages.
Kent, S., and R. Atkinson, "Security Architecture for the Internet Protocol," Request for Comments: 2401, Standards Track, Nov. 1998, 62 pages.
Khare, R., et al., "Upgrading to TLS Within HTTP/1.1," Request for Comments: 2817, Standards Track, May 2000, 13 pages.
Kim, W., et al., "Addition of the ARIA Cipher Suites to Transport Layer Security (TLS)," Request for Comments: 6209, Informational, Apr. 2011, 10 pages.
Lee, H.J., et al., "Addition of SEED Cipher Suites to Transport Layer Security (TLS)," Request for Comments: 4162, Standards Track, Aug. 2005, 7 pages.
Mavrogiannopoulos, N., "Using OpenPGP Keys for Transport Layer Security (TLS) Authentication," Request for Comments: 5081, Experimental, Nov. 2007, 9 pages.
Mavrogiannopoulos, N., and D. Gillmor, "Using OpenPGP Keys for Transport Layer Security (TLS) Authentication," Request for Comments: 6091, Informational, Feb. 2011, 9 pages.
McGrew, D., and D. Bailey, "AES-CCM Cipher Suites for Transport Layer Security (TLS)," Request for Comments: 6655, Standards Track, Jul. 2012, 8 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Medvinsky, A., et al., "Addition of Kerberos Cipher Suites to Transport Layer Security (TLS)," Request for Comments: 2712, Standards Track, Oct. 1999, 7 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Metzger, P., et al., "IP Authentication Using Keyed MD5," Request for Comments: 1828, Standards Track, Aug. 1995, 6 pages.
Moriai, S., et al., "Addition of Camellia Cipher Suites to Transport Layer Security (TLS)," Request for Comments: 4132, Standards Track, Jul. 2005, 8 pages.
Newman, C., "Using TLS with IMAP, POP3 and ACAP," Request for Comments: 2595, Standards Track, Jun. 1999, 16 pages.
Orman, H., "The Oakley Key Determination Protocol," Request for Comments: 2412, Informational, Nov. 1998, 56 pages.
Phelan, T., "Datagram Transport Layer Security (DTLS) over the Datagram Congestion Control Protocol (DCCP)," Request for Comments: 5238, Standards Track, May 2008, 11 pages.
Rescorla, E., "HTTP Over TLS," Request for Comments: 2818, Informational, May 2000, 8 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Rescorla, E., and N. Modadugu, "Datagram Transport Layer Security Version 1.2," Request for Comments: 6347, Standards Track, Jan. 2012, 33 pages.
Rescorla, E., and N. Modadugu, "Datagram Transport Layer Security," Request for Comments: 4347, Standards Track, Apr. 2006, 26 pages.
Rescorla, E., et al., "Transport Layer Security (TLS) Renegotiation Indication Extension," Request for Comments: 5746, Standards Track, Feb. 2010, 16 pages.
Salowey, J., et al., "AES Galois Counter Mode (GCM) Cipher Suites for TLS," Request for Comments: 5288, Standards Track, Aug. 2008, 9 pages.
Salowey, J., et al., "Transport Layer Security (TLS) Session Resumption without Server-Side State," Request for Comments: 5077, Standards Track, Jan. 2008, 21 pages.
Salter, M., and R. Housley, "Suite B Profile for Transport Layer Security (TLS)," Request for Comments: 6460, Informational, Jan. 2012, 15 pages.
U.S. Appl. No. 15/382,571, filed Dec. 16, 2016.
U.S. Appl. No. 15/382,577, filed Dec. 16, 2016.
U.S. Appl. No. 15/382,579, filed Dec. 16, 2016.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Taylor, D., et al., "Using the Secure Remote Password (SRP) Protocol for TLS Authentication," Request for Comments: 5054, Informational, Nov. 2007, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.
Turner, S., and T. Polk, "Prohibiting Secure Sockets Layer (SSL) Version 2.0," Request for Comments: 6176, Standards Track, Mar. 2011, 4 pages.
Dworkin, M., "Recommendation for Block Cipher Modes of Operation: Galois/Counter Mode (GCM) and GMAC," NIST Special Publication 800-38D, Nov. 2007, 39 pages.

(56) References Cited

OTHER PUBLICATIONS

Al-Husainy, "MAC Address as a Key for Data Encryption," International Journal of Computer Science and Information Security 30(30):1-5, Nov. 2013.
European Communication pursuant to Article 94(3) EPC dated Nov. 18, 2020, Patent Application No. 17823321.9, 6 pages.
Indian First Examination Report dated Dec. 4, 2020, Patent Application No. 201917027339, 6 pages.
Indian First Examination Report dated Nov. 13, 2020, Patent Application No. 201917027337, 6 pages.
Kim et al., "A Cryptographically Enforced Access Control with a Flexible User Revocation on Untrusted Cloud Storage," Data Science and Engineering 1(3):149-60, Sep. 6, 2016.
Indian First Examination Report dated Oct. 15, 2020, Patent Application No. 201917027338, 7 pages.
Japanese Non Final Notice of Rejection dated Sep. 29, 2020, Patent Application No. 2019-528633, 1 page.
Japanese Non Final Notice of Rejection dated Sep. 29, 2020, Patent Application No. 2019-531792, 2 pages.
Japanese Notice of Reasons for Rejection dated Oct. 6, 2020, Patent Application No. 2019-528630, 4 pages.
Chinese First Office Action dated Apr. 6, 2021, Patent Application No. 201780083607.2, 9 pages.
Chinese First Office Action dated Mar. 3, 2021, Patent Application No. 201780077914.X, 10 pages.
Japanese Decision for Grant dated Jan. 26, 2021, Patent Application No. 2019-531792, 1 page.
European Communication pursuant to Article 94(3) EPC dated Jul. 5, 2021, Patent Application No. 17823320.1, 10 pages.
European Communication pursuant to Article 94(3) EPC dated Jul. 5, 2021, Patent Application No. 17825706.9, 10 pages.
Chinese First Office Action dated Jun. 3, 2021, Patent Application No. 201780083606.8, 9 pages.
Japanese Final Notification of Reasons for Refusal dated Jun. 1, 2021, Patent Application No. 2019-528633, 2 pages.
Japanese Notice of Reasons for Rejection dated Jun. 15, 2021, Patent Application No. 2019-528630, 3 pages.
Chinese Second Office Action dated Sep. 15, 2021, Patent Application No. 201780077914.X, 6 pages.

\* cited by examiner

INFORMATION SECURITY PROXY SERVICE

BACKGROUND

The providers of integrating services (for example, cloud computing service providers) routinely exchange sensitive information with third-party services. In some cases, the third-party services allow integrating services to authenticate with their services using an open access delegation standard, such as OAuth. Under this model, customers first enter their credentials on a sign-in page hosted by the third-party service, which, upon successful validation, causes a limited access token to be vended to the integrating service for use with the third-party service's application programming interfaces (APIs).

Some third party services use username and password based authentication called "basic authentication." Under the basic authentication model, the customer's username and password must be provided in each request made to the third party's API in order to authenticate with their service. However, secure handling plaintext username and passwords of any third-party service within the integrating service involves the use of significant effort and resources to prevent security breaches that can potentially result in exposure of credentials to unauthorized parties.

BRIEF DESCRIPTION OF THE DRAWINGS

Various techniques will be described with reference to the drawings, in which.

DETAILED DESCRIPTION

Figure 1:
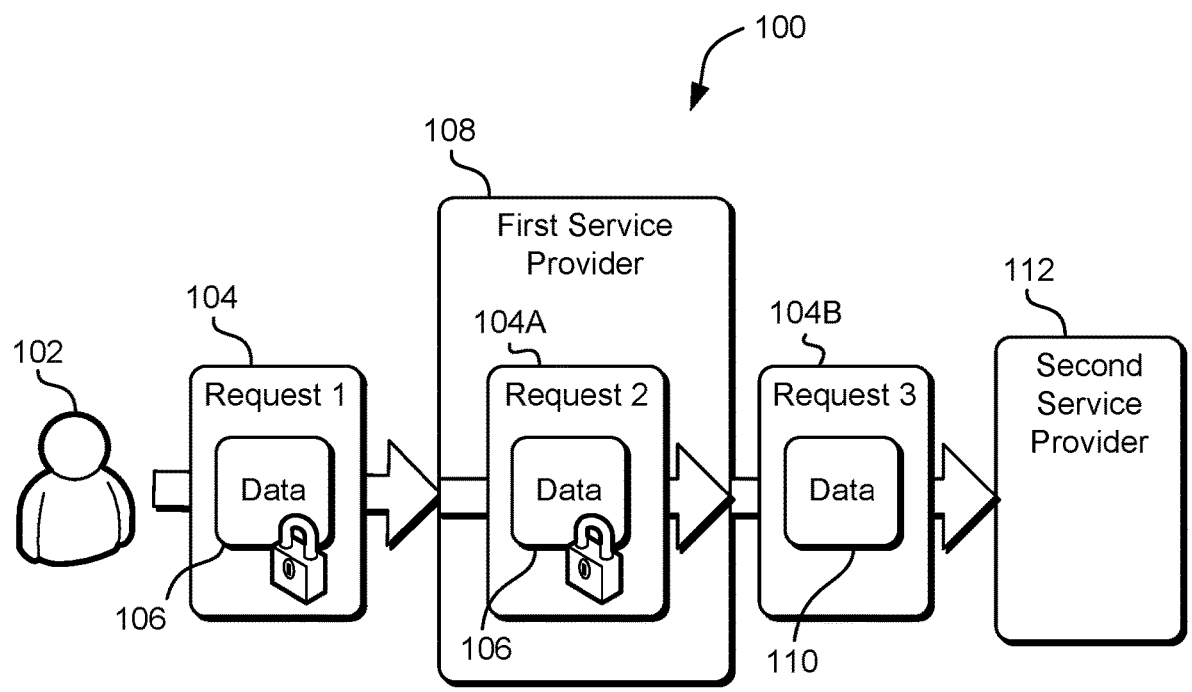
FIG. 1 illustrates an example diagram of a system in which a first service provider integrates with a second service provider in accordance with an embodiment.

Techniques described and suggested herein include systems, methods, and processes for an information security proxy service which intercepts requests initiated within a private network, decrypts sensitive data (e.g., encrypted credentials), and passes that sensitive data on to a third-party service. The information security proxy service may also be called an "information security service" or ISS. The sensitive data is encrypted by a client (such as an application running on a user device) using a cryptographic key associated with the ISS. The data is then passed via message to integrating services within the private network, which determine if the message should be routed to the ISS. The integrating services then route the message to the ISS without decrypting the sensitive data. The ISS uses its cryptographic key to decrypt the sensitive data, places the decrypted sensitive data in a new message (request), and forwards the new request to a third-party service.

In one example, a user will enter credentials in an application hosted on a user device, such as a personal assistant device. The credentials are to access a third-party service to be used in subsequent requests to the third-party service to attempt to access a resource of the third-party service. For example, the third-party service may be an online shopping service and the credentials may be a username and password for accessing the online shopping service. When the user makes a request through the personal assistant application to purchase an item on the online shopping service, the personal assistant application first encrypts the credentials using a public key of the ISS. The encrypted credentials are then embedded in the request and the request is sent to an integrating service hosted in a private network.

The integrating service determines whether the request should be routed directly to the third-party service (the online shopping service), or if it should be routed to the ISS (if it determines the request contains encrypted data). If the request contains encrypted data, it is routed by the integrating service to the ISS. The ISS accepts the request, uses its private key to decrypt the sensitive data (the credentials), and then sends a new request with the decrypted credentials (for example, plaintext credentials) to the third-party service. Finally, the ISS receives the result returned by the third-party service and routes it to the integrating service, which in turn routes the result back to the application on the user device. In an embodiment, the result may also be encrypted by the ISS before it is returned to the integrating service.

As one skilled in the art will appreciate in light of this disclosure, certain embodiments may be capable of achieving certain advantages, including improving the security of a system by reducing the opportunity for unauthorized exposure of user credentials and/or other sensitive data to intermediate services. The techniques described herein also enable more efficient management of cryptographic credentials, thereby reducing the hardware and software resources needed for secure handling of sensitive information.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example diagram of a system 100 in which a first service provider 108 integrates with a second service provider 112 in accordance with an embodiment. A user 102 provides encrypted data 106 as part of a first request (Request 1) 104 to access one or more resources of a second service provider 112. In one embodiment, the encrypted data 106 may be user credentials (e.g., a username, password, etc.) needed for an account hosted by the second service provider 112. The first request 104 containing encrypted data 106 is received at a first service provider 108. The first service provider 108 may alter the first request 104 to create a second request (Request 2) 104A as may be appropriate for internal processing (as will be explained in additional detail in FIG. 2). The first service provider 108 then decrypts the encrypted data 106 to create decrypted data 110, and forwards the decrypted data 110 as part of a third request (Request 3) 104B to the second service provider 112. In an embodiment, the second service provider 112 may be a third-party service such as an online shopping service, cloud calendar service, or a financial service, or any other appropriate type of third-party service.

In an embodiment, the user 102 provides the encrypted data 106 through a computing device and application running on the device that is configured to communicate with the first service provider 108, such as through an application programming interface (API) of the first service provider 108. The application programming interface, for instance, may be a web service interface. The first service provider 108 may be a computer system (e.g., a distributed computer system) configured with hardware and software to provide an interface to users (through user devices) and to perform other operations as described herein for the purpose of performing services. The user credentials, as discussed above, may be a username and password pair, but other types of sensitive data are considered as being within the scope of the present disclosure. Examples are other types of credentials which may include, but are not limited to, symmetric and asymmetric cryptographic keys, one-time password codes, access codes, biometric data, secret codes, shared secrets, personal identifiable information (PII), and/or other information that is classified as sensitive. Examples of PII include, but are not limited to, social security numbers, age, military rank, civilian grade, marital status, race, salary, home phone numbers, other demographic, biometric, personnel, medical, and financial information, or any other information about an individual that identifies, links, relates, or is unique to that individual.

In an embodiment, the first service provider 108 may be an integrating service, a web services provider, a cloud computing platform, an infrastructure-as-a-service (IaaS) platform, or any other appropriate network-based service provider. The first service provider 108 may host an intermediate service, such as a personal assistant voice service, a calendar service, a shopping service, an email or messaging service, a navigation service, or any other appropriate service hosted on a private network. The first service provider 108 may also host an information security service which is responsible for decrypting the encrypted data 106 to create decrypted data 110. Additional detail on the intermediate service and information security service is provided in FIG. 2. The first service provider 108 sends the decrypted data (e.g., decrypted user credentials) to the second service provider 112. The second service provider 112 may be a third-party calendar service, a shopping web site, an email provider, a ride sharing service, or any other appropriate service provider that is separate from and not managed by the first service provider 108.

Figure 2:
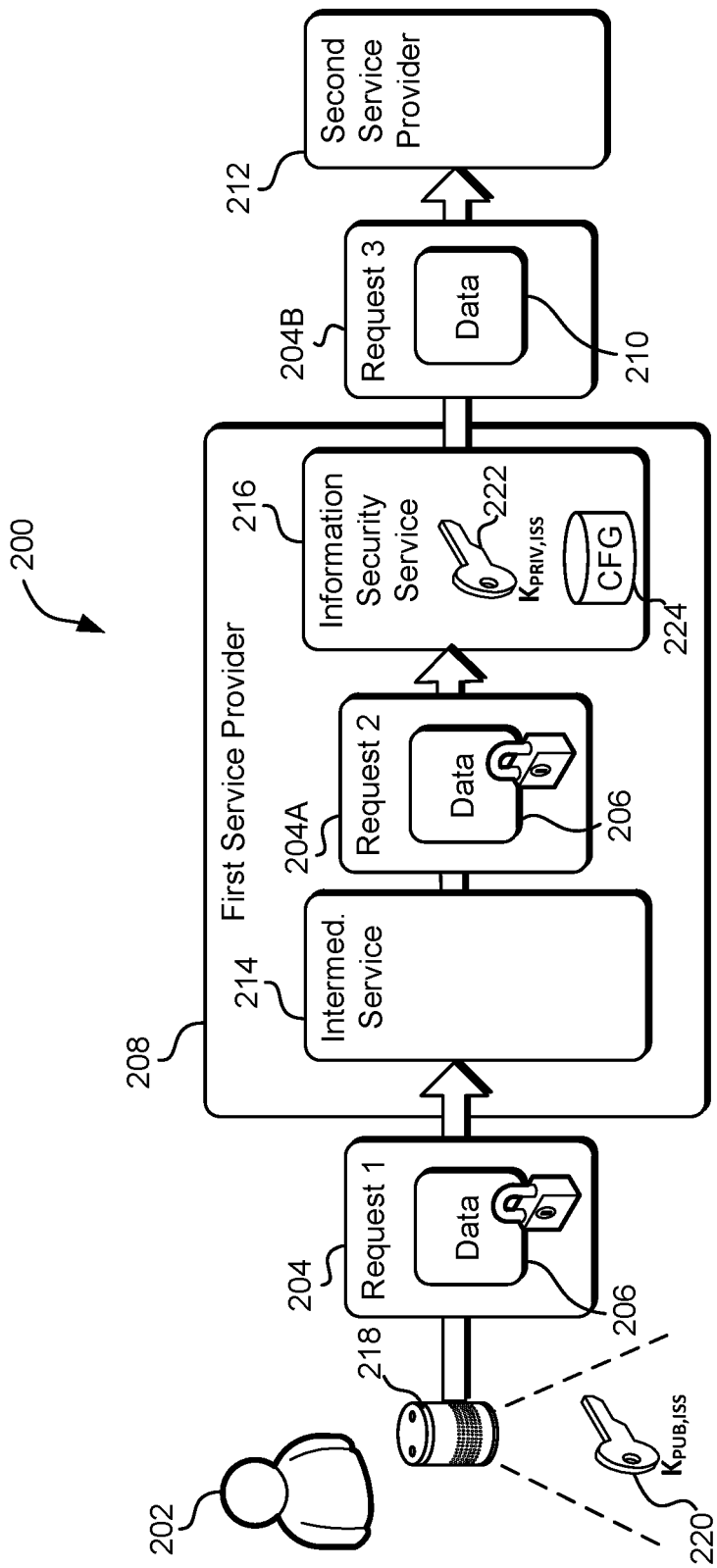
FIG. 2 illustrates an example diagram of an information security proxy service in accordance with an embodiment.

FIG. 2 illustrates an example diagram of a system 200 comprising an information security service in accordance with an embodiment. In an embodiment, a first service provider 208 includes an intermediate service 214 and an information security service (ISS) 216. The first service provider 208 may be the first service provider 108 discussed above in connection with FIG. 1. In an example, the intermediate service 214 is a suite of utilities, applications, components, and/or services hosted on a network or cloud computing service (such as a private network). As previously described in reference to FIG. 1, an intermediate service may be a personal assistant voice service, a calendar service, a shopping service, an email or messaging service, a navigation service, or any other appropriate service hosted on a private network.

In an example, the ISS 216 is a proxy service hosted by the first service provider 208. The intermediate service 214 intercepts a first request (Request 1) 204 and modifies the first request 204 to create a second request (Request 2) 204A. In an embodiment, second request 204A and first request 204 may be identical. In another embodiment, second request 204A may be the result of processing first request 204. This processing may include, but is not limited to, adding a destination to the request, adding information to the request, formatting information contained in the request, or any other appropriate type of processing. In an embodiment, the first request 204 may not contain encrypted data 206, and intermediate service 214 may instead fetch the encrypted data 206 from secure storage (not shown). In another embodiment, first request 204 may contain instructions that allow intermediate service 214 to create the request intended for the second service provider 212, including fetching the encrypted data 206 from secure storage. In this embodiment, first request 204 may be a voice command from user device 218, such as a request to add an event to an external calendar provided by second service provider 212, and, in response, intermediate service 214 may construct the actual request to be sent to second service provider 212 (second request 204A.) The ISS 216 intercepts the second request 204A transmitted to the second service provider 212 (e.g., a third-party service) containing encrypted data 206, decrypts the data, and routes the decrypted data 210 to the second service provider 212 in a new request (Request 3) 204B. In this example, request 204 may be request 104 discussed above in connection with FIG. 1, request 204A may be request 104A of FIG. 1, request 204B may be request 104B of FIG. 1, encrypted data 206 may be encrypted data 106 of FIG. 1, decrypted data 210 may be decrypted data 110 of FIG. 1, and second service provider 212 may be second service provider 112 of FIG. 1.

In an example use case, a user 202 enters user credentials (sensitive data 206) associated with a cloud-based calendar account provided by the second service provider 112 into a user device 218. User 202 may be user 102 discussed above in connection with FIG. 1. User device 218 may be a mobile phone, personal digital assistant, computer, laptop, tablet, or any other appropriate electronic user device. User device 218 encrypts the sensitive data 206 using a public key 220 associated with the ISS 216. User device 218 then embeds or attaches encrypted data 206 into request 204 and transmits a first request 204 to first service provider 208.

The first request 204 (as well as requests 204A and 204B) may be any appropriate type of request, including, but not limited to, a SOAP, XML, or WSDL request, and may be transmitted over any appropriate transport protocol, including, but not limited to, HTTP, TCP/IP, FTP, or SMTP. Any other request type or transport protocol is considered within the spirit of the present disclosure.

Continuing the example of the cloud-based calendar account, intermediate service 214 may be an internal calendar service provided by first service provider 208, where the internal calendar service is specifically integrated with user device 218, which may be a personal assistant device. User 202 may prefer working with an external, third-party calendar service (external calendar service), which, in this example, is second service provider 212 of FIG. 2. In the example use case, user 202 may make a voice command to user device 218, requesting that a new event be added to the user's calendar. User device 218 generates request 204, which contains the "add event" request and supporting information (e.g., date/time/event title), as well as user credentials (e.g., username and password) for the external calendar service. User device 218 encrypts at least the user credentials (encrypted data 206), using a public cryptographic key associated with information security service 216. User device 218 then transmits request 204 to intermediate service 214 (the internal calendar service).

Intermediate calendar service 214 receives request 204 and determines if the request 204 should be routed directly to the second service provider 212 (the external calendar service) or if it should be first routed to ISS 216. This determination may be made by the intermediate service 214 consulting a look-up table specifying request types and associated destinations, by inspection of the request 204, by the intermediate service 214 detecting the presence of encrypted data, by default (i.e., all requests may automatically be routed to the ISS 216), or by any other appropriate method. In the calendar use case, the intermediate calendar service 214 determines that request 204 contains encrypted data 206 which must be decrypted by ISS 216. Intermediate calendar service 214 generates second request 204A, which may be identical to first request 204 or may be modified as described above. Intermediate calendar service 214 routes second request 204A to ISS 216. It should be noted that intermediate service 214 cannot see encrypted data 206, as it has been encrypted with a cryptographic key 220 associated with and the ISS 216.

The ISS 216 receives second request 204A and uses private cryptographic key 222 to decrypt the encrypted data (such as credentials) 206 to create decrypted data (credentials) 210. In an example, ISS 216 may access configuration information from configuration datastore 224 to determine which portions or fields of encrypted data 206 to decrypt, and generate new request (Request 3) 204B containing decrypted data (credentials) 210. The configuration information may include, but not be limited to, a description of header types associated with sensitive information. The ISS 216 then transmits the decrypted data (credentials) 210 to the second service provider 212, the external calendar service, in a new request 204B.

In an embodiment, the ISS 216 may not use configuration information to determine which portions of request 204A to decrypt, and may instead rely on detection of a specific keyword within request 204A. That is, instructions embedded within ISS 216 may cause the ISS 216 to detect and replace the keyword and/or any sensitive or encrypted data associated with the keyword, without the need for additional, external configuration data.

In an embodiment, user device 218 may use network-based security services to perform the encryption and decryption of user credentials or other sensitive data, rather than using client-side encryption processes. Some cloud computing service providers offer network-based services for the secure ingress of sensitive data (sensitive data entering the cloud computing service network) and secure egress of sensitive data (sensitive data leaving the cloud computing service network). Instead of encrypting the sensitive data itself, user device 218 may call, for example, a secure ingress service of the cloud computing service platform, which would accept the sensitive data, encrypt it, and store it separately from the intermediate service 214. In this embodiment, the encrypted data 206 may not be sent as part of first request 204, but may be retrieved by the ISS 216 from an approved datastore used by the secure ingress system upon receipt of request 204 and embedded in second request 204A. A similar approach may be used for sensitive data leaving the cloud computing service platform, using a secure egress function. Examples of such secure ingress and secure egress are described in U.S. patent application Ser. No. 15/382,571, filed on Dec. 16, 2016, entitled "SECURE DATA INGESTION FOR SENSITIVE DATA ACROSS NETWORKS," U.S. patent application Ser. No. 15/382,577, filed on Dec. 16, 2016, entitled "SECURE DATA EGRESS FOR SENSITIVE DATA ACROSS NETWORKS," and U.S. patent application Ser. No. 15/382,579, filed on Dec. 16, 2016, entitled "SECURE DATA DISTRIBUTION OF SENSITIVE DATA ACROSS CONTENT DELIVERY NETWORKS," the disclosures of which are incorporated herein by reference for all purposes.

In an alternate example use case, user 202 may use a mobile phone (user device 218) to access a music service through first service provider 208. That is, the intermediate service 214 may be an application providing a user interface to a third-party music service. User 202 opens the music service application on the user device 218 and searches for songs by a particular artist. The music service application hosted on the mobile phone 218 formulates a request 204 for the intermediate service 214. If this is the first time the user 202 has used this music service, the music service application may prompt the user 202 to enter the user credentials of an account associated with the music service. Once the user credentials are obtained, the music service application may encrypt the use credentials and embed them in the request 204, or may use a secure ingress service such as that described in U.S. patent application Ser. No. 15/382,571, filed on Dec. 16, 2016, entitled "SECURE DATA INGESTION FOR SENSITIVE DATA ACROSS NETWORKS" to encrypt and store the credentials in secure storage for later retrieval by the intermediate service.

The user device 218 then transmits the completed request 204 with the encrypted user credentials (encrypted data) 206 (or a link to the encrypted data 206 as stored in secure storage) to the intermediate service 214. Intermediate service 214 processes request 204 by determining if it can be routed directly to the music service (the second service provider 212), or if it must generate second request 204A to pass through the ISS 216 so that the encrypted credentials may be decrypted for use with the music service (second service provider) 212. In determining that the request 204 needs to be routed to ISS 216, the intermediate service fetches the encrypted credentials from secure storage, if required, to complete second request 204A before routing it to the ISS 216.

As previously described, the intermediate service 214 may need to fetch the encrypted credentials from secure storage and embed them in second request 204A before forwarding it on to ISS 216. Other minor changes may be made to first request 204 to generate second request 204A which are within the spirit of the present disclosure. Although first request 204 is shown in FIG. 2 as being modified to create second request 204A, in an embodiment, intermediate service 214 may alternately pass first request 204 directly to the ISS 216 without modification.

The ISS 216 receives second request 204A and decrypts the credentials to create a set of decrypted data (user credentials) 210, which can be used directly to access the music service (second service provider) 212. These decrypted data (user credentials) 210 are transmitted in a third request (Request 3) 204B to the music service (second service provider) 212, which uses the decrypted data (user credentials) 210 to allow access to the account of the user 202, fulfilling the request made to the music service (second service provider) 212.

Figure 3:
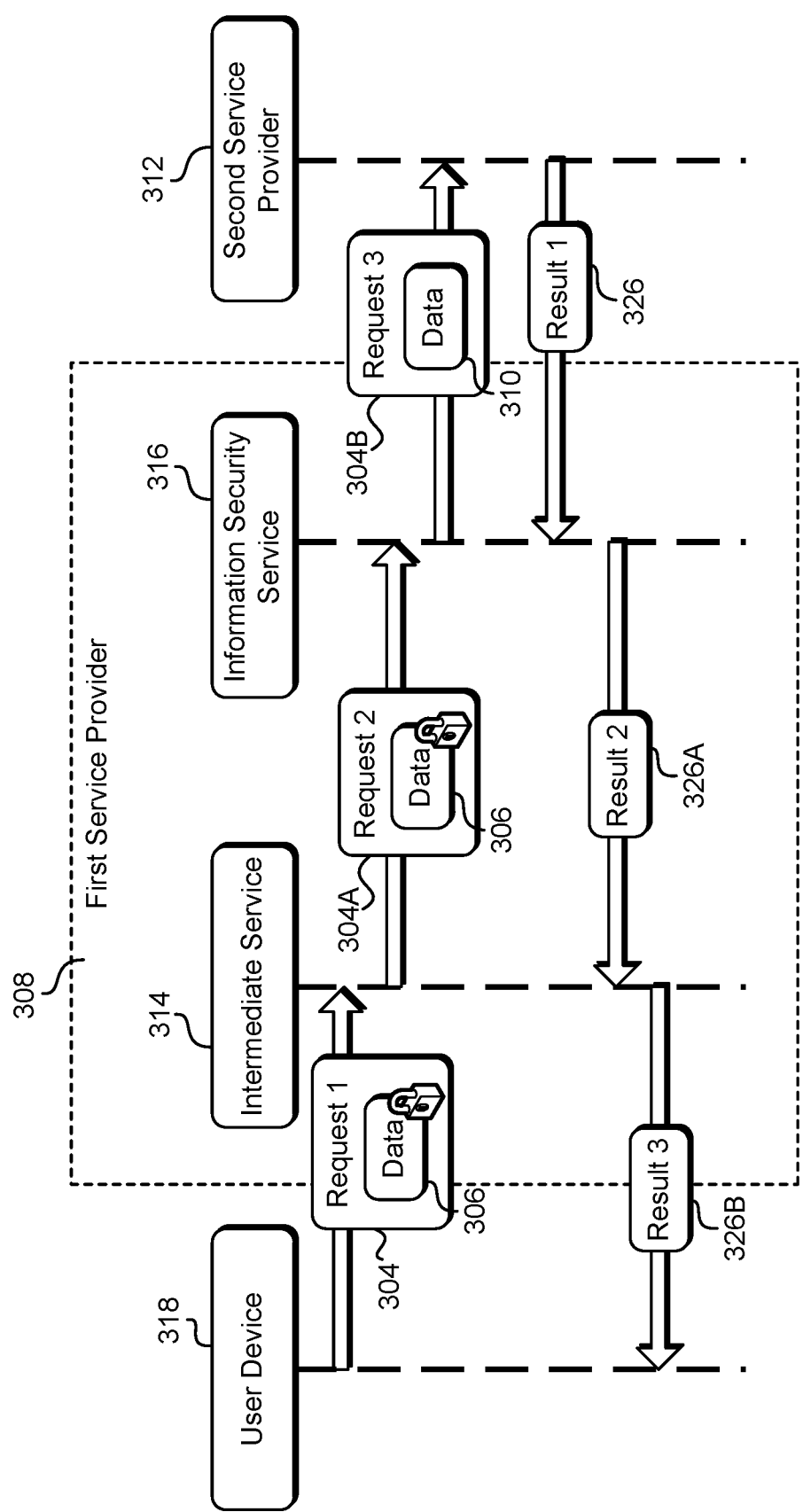
FIG. 3 illustrates an example sequence diagram for an information security proxy service in accordance with an embodiment.

FIG. 3 illustrates an example sequence diagram for the information security service of FIG. 2 in accordance with an embodiment. User device 318 generates a first request (Request 1) 304 to access a resource of second service provider 312. Request 304 contains encrypted data 306, which in, in an example, may be encrypted credentials associated with an account hosted by second service provider 312. User device 318 transmits request 304 to an intermediate service 314 (hosted by a first service provider 308), wherein the intermediate service 314 is responsible for processing request 304. Intermediate service 314 determines whether request 304 should be routed directly to second service provider 312 or if a third request (Request 3) 304B needs to be created and forwarded to the ISS 316. As described herein, intermediate service 314 may make this determination by consulting a datastore (not shown) associating requests 304 with one or more third-party services, or it may simply route all requests 304 to ISS 316. As previously described, in an example embodiment, second request 304A may be identical to first request 304, or may be modified as previously described herein. It should be noted that intermediate service 314 does not have access to encrypted data 306 but simply routes the data as part of the request 304A to the appropriate end point.

ISS 316 receives the routed second request 304A and decrypts the encrypted data 306 to obtain decrypted data 310. ISS 316 then creates third request 304B and places decrypted data 310 inside the request 304B. Second service provider 312 receives request 304B and uses decrypted data 310 to process the request 304B. Second service provider 312 then obtains a first result 326 from processing request 304B and returns result 326 to ISS 316. ISS 316 may modify first result 326 to create a second result 326A, and forwards the result 326A to the intermediate service 314, which in turn generates result 326B, based at least in part on result 326A, and routes the result 326B back to the user device 318. It should be noted that, in an embodiment, result 326B may be identical to result 326A, and/or result 326A may be identical to result 326. Differences between results 326, 326A, and 326B may include, but are not limited to adding a destination to the result, adding information to the result, formatting information contained in the result, performing a cryptographic operation on the result, or any other appropriate type of processing.

It should be noted that intermediate service 314 may be intermediate service 214 discussed above in connection with FIG. 2, user device 318 may be user device 218 of FIG. 2, request 304 may be request 204 of FIG. 2, request 304A may be request 204A of FIG. 2, request 304B may be request 204B of FIG. 2, encrypted data 306 may be encrypted data 206 of FIG. 2, decrypted data 310 may be encrypted data 210 of FIG. 2, and second service provider 312 may be second service provider 212 of FIG. 2.

It should be appreciated that alternate embodiments may have numerous variations from that described above. For example, in an embodiment, ISS 316 may encrypt the result 326 received from second service provider 312 before routing the encrypted result to the intermediate service 314. Numerous other variations are within the spirit of the present disclosure.

Figure 4:
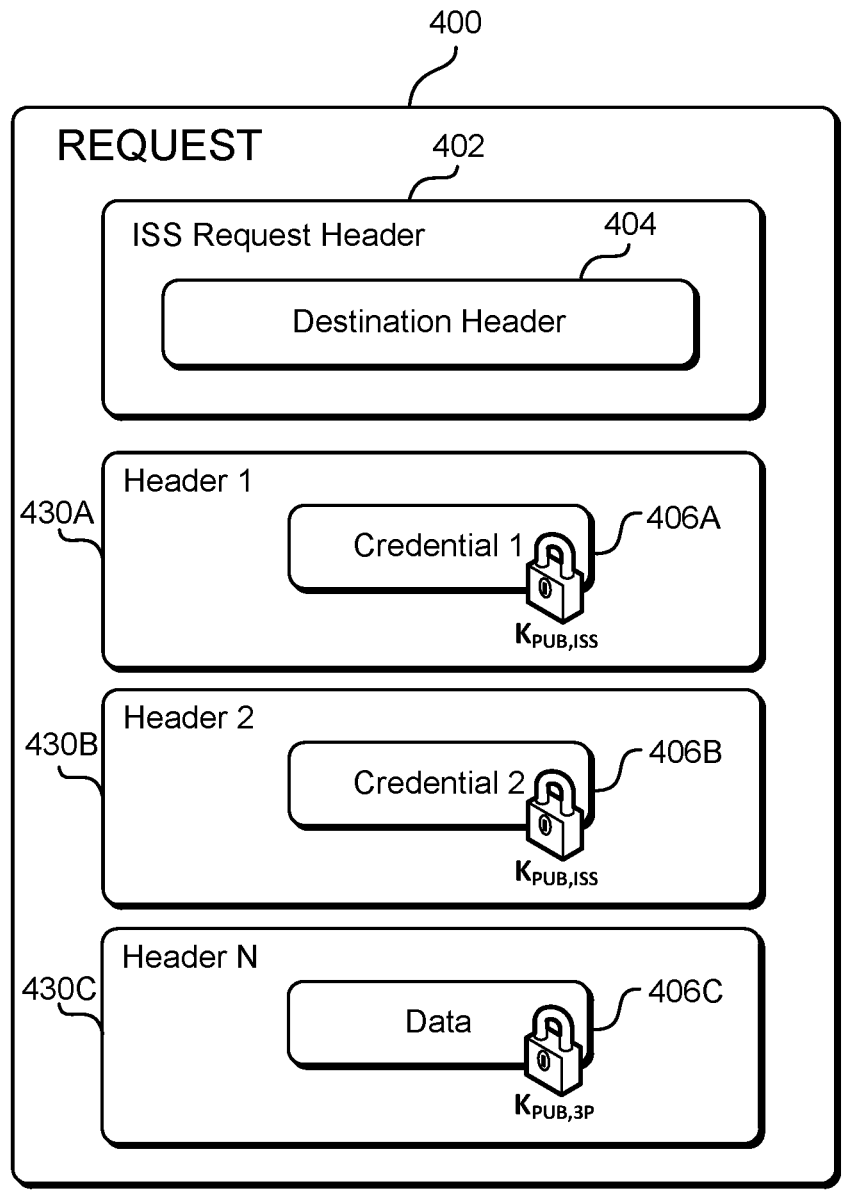
FIG. 4 illustrates an example request to access a resource of a third-party service in accordance with an embodiment.

FIG. 4 illustrates an example request 400 to access a resource of a third-party service in accordance with an embodiment. Request 400 may be request 304 discussed in connection with FIG. 3 above, or alternately may be request 304A of FIG. 3. In an embodiment, request 400 is created by a user device (such as user device 318, FIG. 3) in order to attempt to access a resource of a third-party service (for example, the second service provider 312 of FIG. 3). In an embodiment, request 400 may include a series of headers defining various types of data. In the example of FIG. 4, request 400 includes an ISS request header 402 which is associated with a destination header 404. ISS request header 402 may be a specific header created by the user device (318, FIG. 3) to contain and/or indicate the destination header 404. The destination header 404 indicates the network location that will be the final destination of request 400. In an alternate embodiment, ISS request header 402 may be created by the intermediate service (314, FIG. 3).

Request 400 may also contain a number of data headers, including, for example, header 1 430A, header 2 430B, and any appropriate number of other headers, represented in FIG. 4 as header N 430C. Some or all of the headers 430A/B/C may contain encrypted data 406. In an example, header 1 430A may indicate encrypted user credential 406A, header 2 430B may indicate encrypted user credential 406B, and header N 430C may contain other encrypted data 406C. In the example of FIG. 4, encrypted user credential 406A and encrypted user credential 406B are encrypted using a public cryptographic key associated with the ISS (312, FIG. 3), while encrypted data 406C is encrypted with a public cryptographic key associated with a third-party service (such as second service provider 312 of FIG. 3). In other words, various types of data may be contained by or indicated by request 400, some of which may be plaintext (unencrypted) and some of which may be encrypted using one or more cryptographic keys. In an embodiment, in addition to data headers, request 400 may also contain a body (not shown), and the body may contain encrypted data which may be decrypted by information security service 316.

Figure 5:
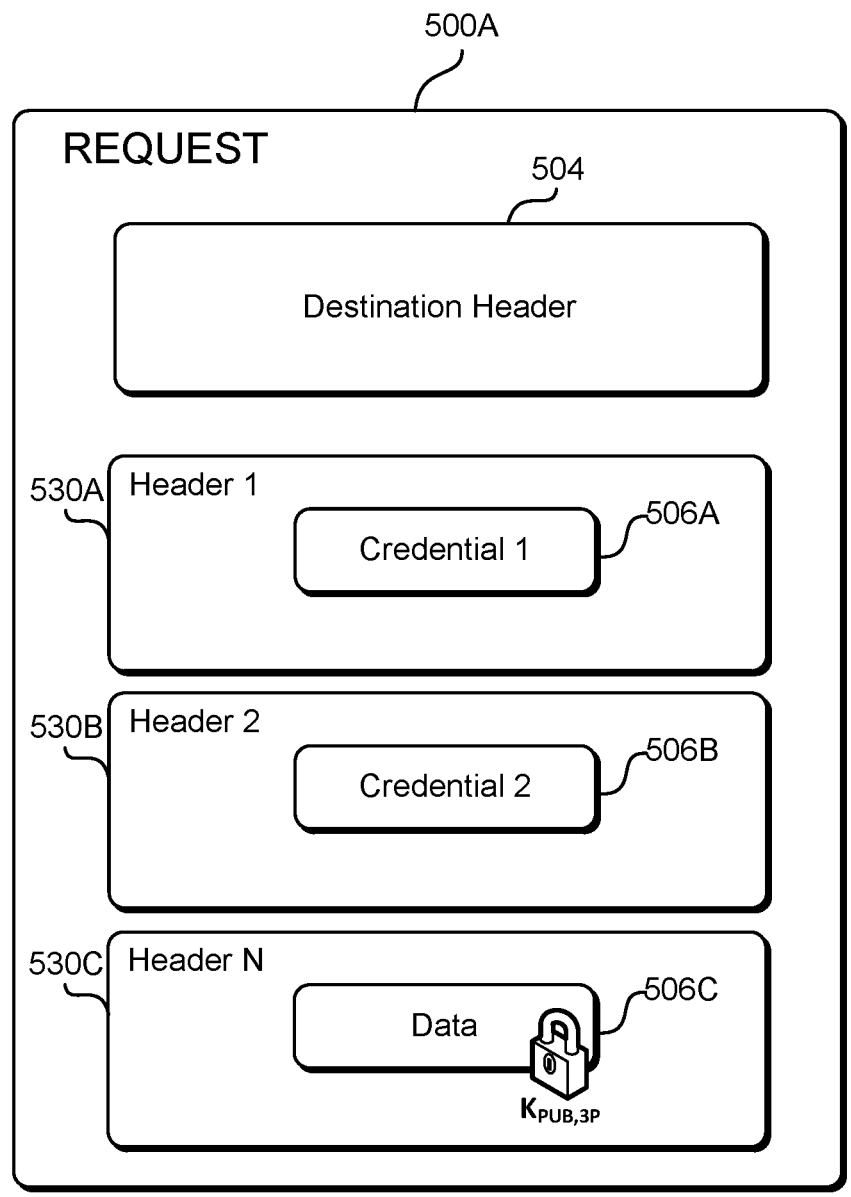
FIG. 5 illustrates an example request to access a resource of a third-party service after processing by an information security proxy service in accordance with an embodiment.

In an embodiment, request 400 of FIG. 4 is received by ISS (316, FIG. 3) and processed to create new request 500A. Request 500A may be request 304B discussed in connection with FIG. 3 above. FIG. 5 illustrates an example request 500A to access a resource of a third-party service after processing by an information security service in accordance with an embodiment. After processing by ISS (316, FIG. 3), the ISS request header 402 of FIG. 4 has been stripped out of request 500A, leaving destination header 504, which contains the destination address for request 500A. Destination header 504 may be destination header 400A discussed above in connection with FIG. 4. ISS 316 has also generated credential 506A of header 530A and credential 506B of header 530B. Header 530A may be header 430A as discussed in connection with FIG. 4, and credential 506A may be the result of a decryption process performed on encrypted credential 406A of FIG. 4. Similarly, Header 530B may be header 430B as discussed in connection with FIG. 4, and credential 506B may be the result of a decryption process performed on encrypted credential 406B of FIG. 4. In this example, header 530C may be header 430C of FIG. 4, and encrypted data 506C may be encrypted data 406C of FIG. 4. In other words, in the case of encrypted data 506C, the ISS 316 may have determined not to attempt to decrypt the encrypted data, as encrypted data 506C will be decrypted as appropriate by the destination third-party service. As previously described, ISS 316 may determine which headers 530A-530N to process based on information obtained from a configuration datastore (such as datastore 224, FIG. 2). Following processing by ISS 316, request 500A may be routed to a third-party service, such as second service provider 312, FIG. 3.

Figure 6:
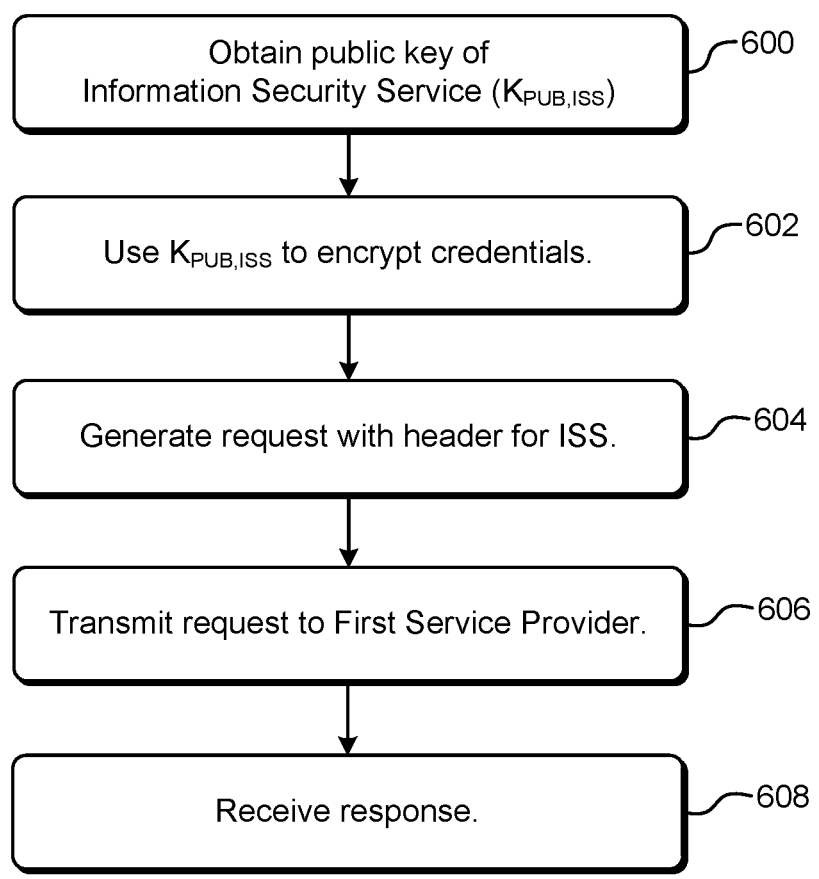
FIG. 6 illustrates an example flowchart for a user device in accordance with an embodiment.

FIG. 6 illustrates an example flowchart for a user device (such as user device 218, FIG. 2) in accordance with an embodiment. The process of FIG. 6 is performed in response to a trigger event such as a user request which requires interaction with a third-party service provider. For example, a user may make a spoken request to a personal assistant device to add a new event to their online calendar, where the calendar is provided by a third-party service. In another example, a user may use a graphical interface on a mobile device (e.g., a smart phone) to interact with an online shopping service. In both of these examples, interaction with a third-party service (e.g., the online calendar service, the online shopping service, etc.) may require a set of user credentials corresponding to an account tied to the third-party service. In order to ensure the security of the credentials as they are passed through the first service provider (e.g., a cloud computing service provider), the credentials can be encrypted as they pass through the first service provider and eventually decrypted before they arrive at the third-party service. In an embodiment, this encryption may be done using a public cryptographic key of a information security service, such as ISS 216 of FIG. 2. At step 600, user device 218 obtains a public key of ISS 216. The user device 218 may obtain the public key in various ways in accordance with various embodiments. For example, the user device 218 may make a call to a secure online service to retrieve the public key, query a hardware security module, obtain the public key from a digital certificate associated with the ISS 216, obtained from a trusted certificate authority, or any other appropriate method of obtaining the public key.

At step 602, the user device 218 uses the public key to encrypt a set of user credentials. In one example, the user device 218 encrypts the credentials using an asymmetric encryption algorithm, such as described below. The user device 218 generates a request to access a resource of a third-party provider, the request containing an ISS header which contains at least a destination address for the third-party provider (step 604). In an embodiment, the user device generates the request to be an HTTP request or in accordance with another format, such as described above. The user device 218 then transmits the request to the first service provider at step 606. This transmission may be done by any appropriate method. In an example embodiment, user device 218 transmits the request over a local wireless network to a wireless router, which then forwards the request over the Internet to the first service provider. Finally, the user device receives a response from the third-party service at step 608, typically returned through the first service provider.

In various embodiments, data objects such as credentials are made to be cryptographically verifiable. In one example, cryptographically verifiable data objects are created to be cryptographically verifiable by the system to which the data object is to be provided or another system that operates in conjunction with the system to which the data object is to be provided. For example, as noted above, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security.

The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). Other variations, including variations where a symmetric key is shared between the two entities can be used to encrypt and/or digitally sign the data object.

As discussed, numerous variations utilize symmetric and/or asymmetric cryptographic primitives, or a hybrid encryption mechanism incorporating features of both symmetric and asymmetric systems. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Figure 7:
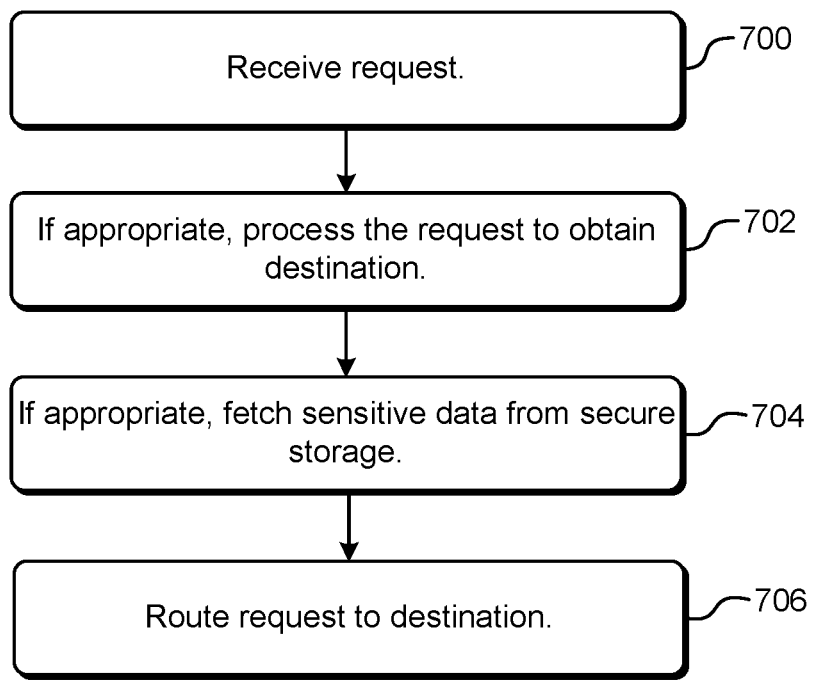
FIG. 7 illustrates an example flowchart for an intermediate service in accordance with an embodiment.

FIG. 7 illustrates an example flowchart for an intermediate service (such as intermediate service 214, FIG. 2) in accordance with an embodiment. At step 700, the intermediate service 214 receives the request (for example, request 204 as transmitted by user device 218, FIG. 2). Intermediate service 214 processes the request to determine the destination of the request (step 702). As previously described, this determination may be performed by processing a header contained in the request, accessing a look-up table in a datastore, or any other appropriate method of determining the destination. At step 704, the intermediate service 214 may determine that the request is to be routed to the ISS 216 and that sensitive data that has previously been encrypted (for example, by a separate encryption service of the first service provider) is not contained in the request, but instead must be fetched via an application programming interface (API) call from the secure storage location used by the encryption service. In this step, the request may contain a link to the secure storage location or instructions for fetching the sensitive data. Finally, the intermediate service 214 routes the request to the appropriate destination at step 706. The message may be sent directly to a third-party service or may be routed to the ISS 216 for processing.

Figure 8:
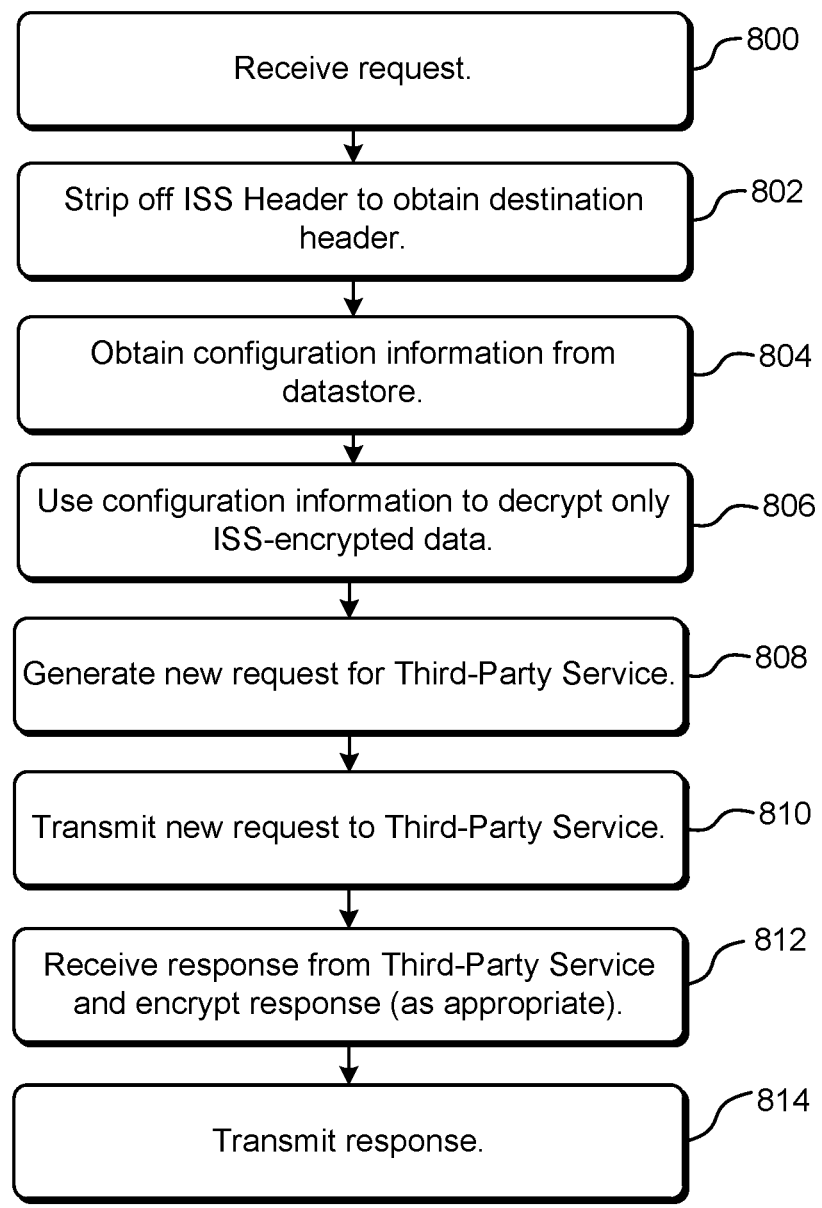
FIG. 8 illustrates an example flowchart for an information security service in accordance with an embodiment.

FIG. 8 illustrates an example flowchart for information security service (ISS) 216 in accordance with an embodiment. At step 800, ISS 216 receives a request (400, FIG. 4). The ISS 216 strips off the ISS request header to obtain the destination header (step 802). The ISS 216 then obtains configuration information, as appropriate, from a datastore (224, FIG. 2) at step 804, and at step 806, uses the configuration information to decrypt the data associated with the appropriate headers (i.e., determines which headers have data encrypted with a key associated with the ISS and decrypts those data fields only.) At step 808, the ISS 216 generates a new request (500A, FIG. 5) containing the destination header and the decrypted data fields. The ISS 216 then routes new request 500A to a third-party service (such as second service provider 212, FIG. 2) at step 810. The third-party service receives the new request 500A and, if appropriate based on the decrypted user credentials, grants access to the service and completes the request, returning a response to the ISS 216. At step 812, the ISS 216 receives the response from the third-party service and encrypts that response, if appropriate, for routing back to the intermediate service 214 for eventual return to the user. Finally, at step 814, the ISS 216 transmits the response to the intermediate service 214, to be returned to the user device.

Figure 9:
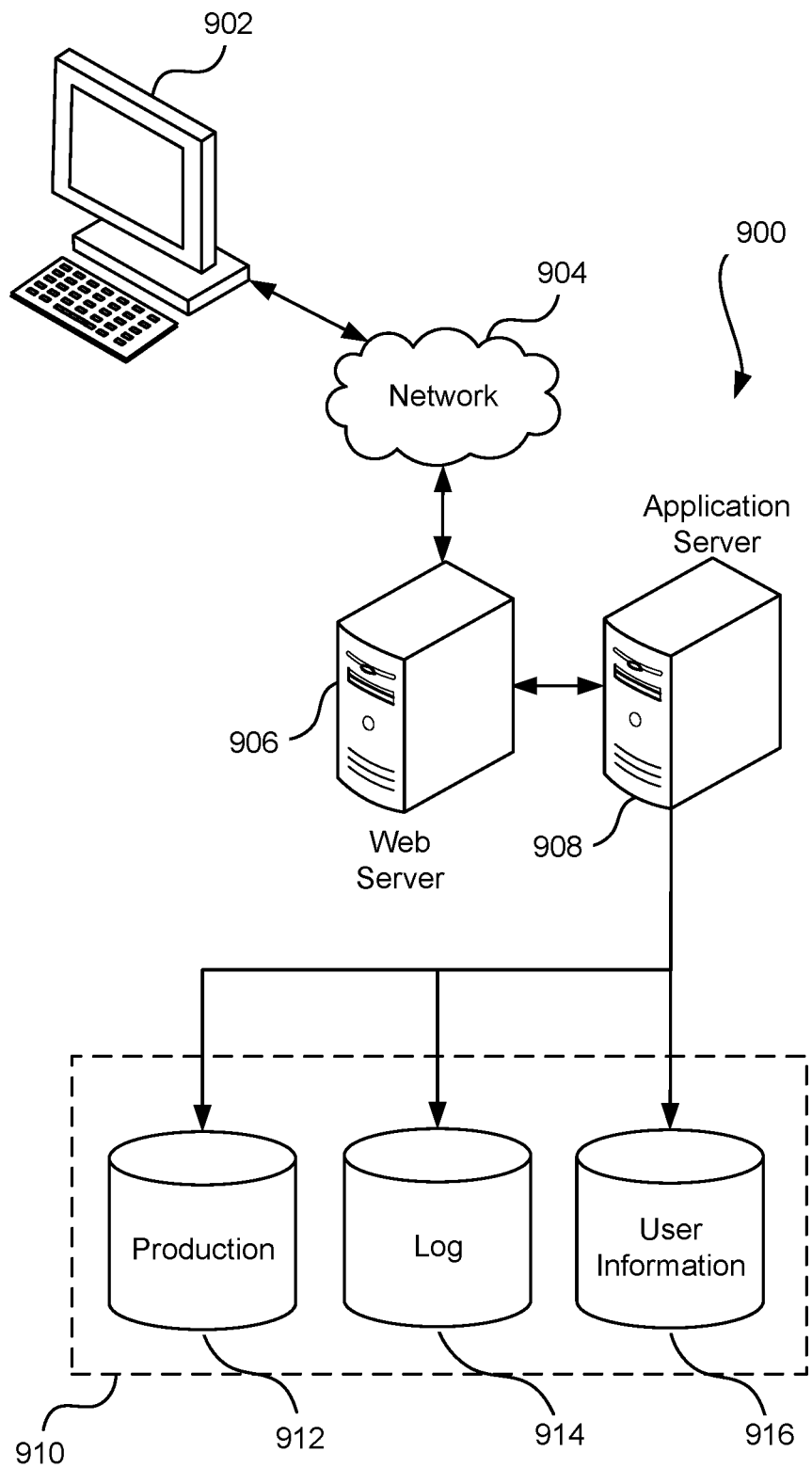
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as My SQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   memory including instructions that, when executed by the at least one processor, cause the system to execute:
   a first service that:
   receives a first request;
   generates a second request that comprises encrypted data and is addressed to a second service;
   receives a first response to the second request; and
   uses the first response to provide a second response to the first request; and
   the second service, wherein the second service:
   receives the second request;
   causes the second request comprising the encrypted data to be transformed by at least replacing the encrypted data with plaintext data, thereby resulting in a transformed second request;
   transmits the transformed second request to a third service; and
   forwards, to the first service, data from the third service in the first response.

2. The system of claim 1, wherein the encrypted data comprises encrypted credentials for accessing a resource of a third-party service provider.

3. The system of claim 1, wherein the first service receives the encrypted data in the first request.

4. The system of claim 1, wherein the first service generates the encrypted data by encrypting data received in the first request.

5. The system of claim 1, wherein the second service encrypts the data from the third service before forwarding it in the first response.

6. A computer-implemented method, comprising:
   receiving a request from a computing device that comprises first data with encrypted data and that is addressed to a first service;
   transforming the request by at least replacing the first data with other data, thereby resulting in a transformed request, wherein the other data comprises plaintext data;
   transmitting the transformed request to a second service; and
   transmitting, in response to the request, second data received from the second service in response to the transformed request to the computing device.

7. The computer-implemented method of claim 6, wherein:
   the other data comprises a result of decrypting the encrypted data.

8. The computer-implemented method of claim 7, wherein:
   the encrypted data comprises first encrypted data encrypted with a first cryptographic key and second encrypted data encrypted with a second cryptographic key; and
   decrypting the encrypted data comprises decrypting only the first encrypted data.

9. The computer-implemented method of claim 6, further comprising:
   obtaining configuration data related to the request; and
   determining, based at least in part on the configuration data, a location of the first data within the request.

10. The computer-implemented method of claim 6, further comprising:
    detecting information within the request; and
    as a result of detecting the information, determining, based at least in part on the information, a location of the first data within the request.

11. The computer-implemented method of claim 6, further comprising encrypting the second data.

12. The computer-implemented method of claim 6, wherein:
- the first data comprises encrypted user credentials for accessing the second service; and
- the other data comprises a result of decrypting the encrypted user credentials.

13. A non-transitory computer-readable storage medium having stored thereon executable instructions that, as a result of being executed by one or more processors of a computer system, cause the computer system to at least:
- generate a second request based at least in part on a first request received by a first service, wherein the second request comprises information that enables a second service to:
  - transform the second request by at least replacing data in the second request with other data comprising data that enables a third service to access plaintext data to result in a transformed second request; and
  - transmit the transformed second request to the third service; and
- transmit the second request to the first service to obtain data from the third service for a response to the first request.

14. The non-transitory computer-readable storage medium of claim 13, wherein:
- the data in the second request is encrypted data; and
- the other data comprises a result of decrypting the encrypted data.

15. The non-transitory computer-readable storage medium of claim 14, wherein a source of the encrypted data is the first request.

16. The non-transitory computer-readable storage medium of claim 14, wherein the encrypted data is a result of encrypting data from the first request.

17. The non-transitory computer-readable storage medium of claim 14, wherein the encrypted data is a set of user credentials for accessing the third service.

18. The non-transitory computer-readable storage medium of claim 13, wherein the instructions further comprise instructions that, as a result of being executed by the one or more processors, cause the computer system to encrypt data from the first request to create the data in the second request.

19. The non-transitory computer-readable storage medium of claim 13, wherein the instructions further include instructions that cause the computer system to examine a content of the first request to determine a location of the first service.

20. The non-transitory computer-readable storage medium of claim 13, wherein the data in the second request comprises an address of a datastore containing a set of encrypted data, and the other data is a result of fetching the set of encrypted data from the datastore and decrypting the set of encrypted data.

\* \* \* \* \*